C. S. S. BARON & C. H. TALLMAN.
Oil-Can.
No. 199,251. Patented Jan. 15, 1878.
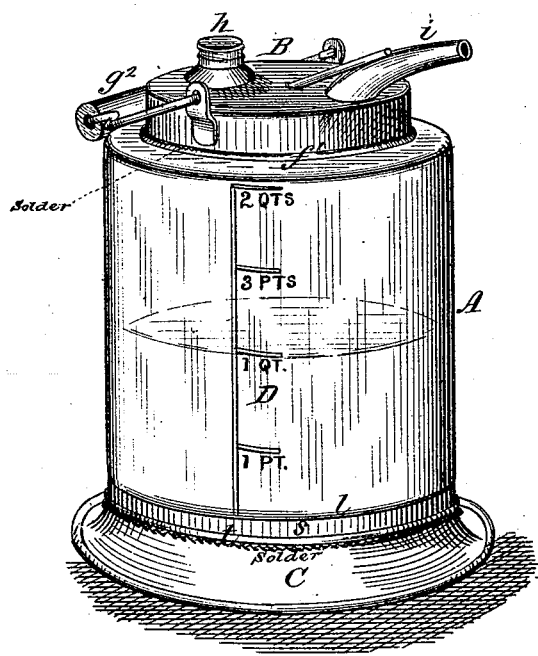
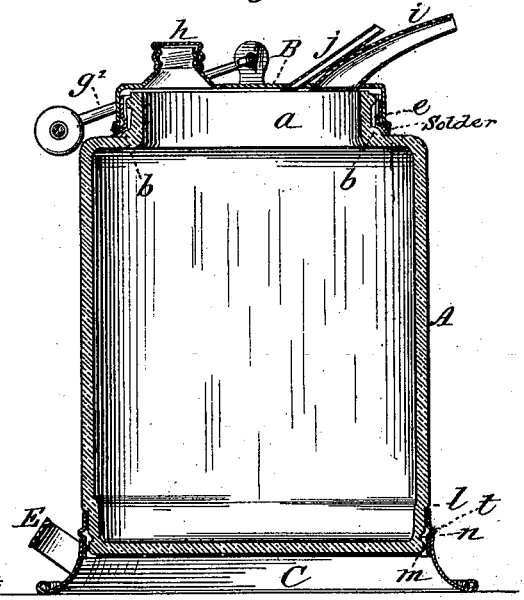
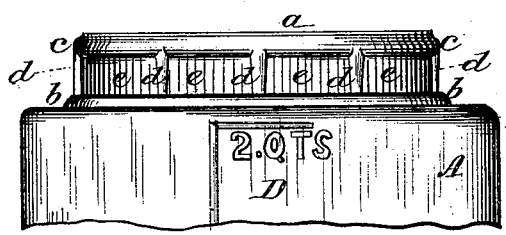
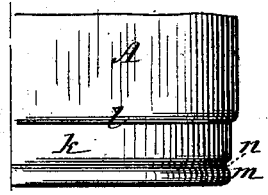
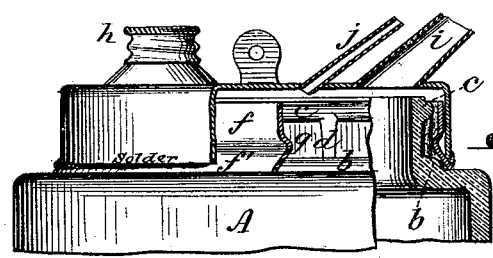
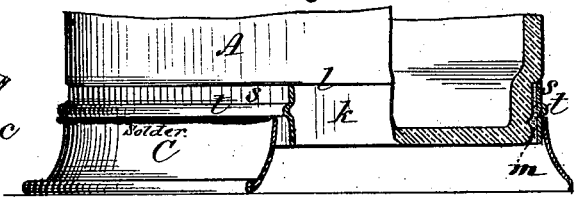
Chas. S. S. Baron.
Chas. H. Tallman.
Inventors.
Attest:
H. L. Perrine.
Floyd Norris.
By Johnson & Johnson
Attorneys.

UNITED STATES PATENT OFFICE.

CHARLES S. S. BARON AND CHARLES H. TALLMAN, OF BELLAIRE, OHIO.

IMPROVEMENT IN OIL-CANS.

Specification forming part of Letters Patent No. 199,251, dated January 15, 1878; application filed November 14, 1877.

*To all whom it may concern:*

Be it known that we, CHARLES S. S. BARON and CHARLES H. TALLMAN, of Bellaire, in the county of Belmont and State of Ohio, have invented certain new and useful Improvements in Oil-Cans; and we do hereby declare that the following is a full, clear, and exact description thereof, which will enable others skilled in the art to which it appertains to make and use the same, reference being had to the accompanying drawings, and to letters of reference marked thereon, which form a part of this specification.

We have produced an improved oil-can consisting of a glass oil-holder with a graduated scale, a metallic fixed cover having a spout, a vent-tube, a filling-nozzle, and a bail, and a shielding and supporting base. The cover and the base are secured to the glass body in a peculiar manner, rendering it safe to handle and carry the can by means of its cover-attached bail.

As an improved article of manufacture, the measure of the oil is always seen, thus preventing short measure by dealers, and showing at all times the quantity on hand. It can be easily kept clean, its cheapness is greatly enhanced, and it has the important advantage of showing the quality of the oil.

Oil-cans have been made with a removable tapering glass oil-holder incased in a metal case, with interposed packing, and glass buckets have been made with a metal base-protecting ring, a removable cover, and a carrying-bail secured by a metal band to the body of the glass vessel below its top; but these things are not such an article of manufacture as we have produced; nor have we been able to find such an article in the market, either in appearance, in construction, or possessing like advantages in use.

Referring to the drawings, Figure 1 represents a view in perspective of an oil-can embracing our invention; Fig. 2, a vertical central section; Fig. 3, an elevation of the neck of the glass oil-holder; Fig. 4, a detail elevation of the same, showing a portion of the cover-holding metal ring as secured thereon; Fig. 5, an elevation of the bottom portion of the glass oil-holder; and Fig. 6, a similar view, showing a portion of the metal bottom-holding ring secured thereon.

The glass oil-holder A has a neck, $a$, around the base of which is formed an outward-projecting bead, $b$, and around the top edge of said neck is a similar outward-projecting bead, $c$, these two annular beads being connected by a series of vertical ridges, $d$, thus forming around the neck a series of recesses, $e$, the function of which will presently be stated. Upon this neck $a$ we secure a thin metal band, $f$, having an inward-projecting bead, $g$, fitting the neck closely, and resting upon the lower glass bead $b$. The base $f'$ of said band flares outward, and extends down around said last-mentioned bead. Above the band-bead $g$ the band sets out a little from the upper neck-bead $c$, to leave an annular space through which to pour cement, which, filling the recesses $e$ in the neck between the band and below the top neck-bead, secures the band to the neck. The cement adheres more firmly to the metal than to the glass; but the glass ridges $d$ and top bead $c$, projecting into the cement, effectually prevent the band from slipping around, it being also prevented from slipping off the neck. Having the metal band securely attached to the neck, we next place over and upon this band the closely-fitting cover B, the lower edge of the rim of which rests upon the lower flaring portion $f'$ of the band, which thus forms an accessible metal surface, to which the cover is soldered. The cover is provided with a bail, $g^2$, a screw-capped filling-nozzle, $h$, a spout, $i$, and an air-tube, $j$, as usual in oil-cans.

The cover being fixed to the glass neck and the bail to the cover by ears, the glass can is thereby handled and carried by its cover-bail.

Around the outside bottom portion of the glass oil-holder is an annular recess, $k$, terminating in a top upward flaring shoulder, $l$, and at the bottom of this recess is a bead, $m$, along the upper edge of which runs an annular groove, $n$, which is crossed vertically by ridges $r$, and around and within this recess a metal band, $s$, is secured, having an outward circumferential bead, t, and the upper edge of this band s rests against the upward flaring shoulder l of said recess.

This construction gives to the metal band a slight spring upward, which, in case the can should be dropped, would relieve the glass from the sudden jar. The can is then turned upside down, and cement or plaster-of-paris poured into the space between the band and the glass, filling the recess k and groove n, as well as the interior of the band-groove; and, the cement becoming hard, the ridges r will prevent the band from turning, while the base-bead m prevents it from slipping off in the same manner that the bead and ridges on the neck prevent similar displacements of the cover-holding band. The bottom band having been thus secured to the glass can, we secure the metal flaring foot or base C upon said band by slipping the foot over the band, so that the bead of the latter rests upon the upper edge of the foot, and there soldering them together. Solder may also be put in between the lower portion of the band and the inner side of the base, to increase the security of the connection.

As the upper edge of the foot-band rests against the upward flaring shoulder of the annular recess k, the concussion between the band and the glass can will not be so violent as it would be if the band abutted against an abrupt projection or right-angled shoulder, while at the same time the resistance is sufficient to prevent the oil-holder from slipping through the band in case the cement should give way.

The foot or base C should be wired in the ordinary way at its lower edge.

In the outer surface of the glass oil-holder is molded or cut a vertical measuring-scale, D, the graduations of which may indicate greater or less quantities, as desired, and is very convenient, as permitting the oil to be seen at all times, preventing short measure, and showing the quality of the oil.

The foot or base has a finger-hold, E, for tilting the can in filling lamps.

The indicating element gives the advantage of allowing the dealer to use the can as the measure, and so avoid the use of an intermediate or transferring measuring-cup, and all the spilling and dirt nuisance attending the sale of oils.

We claim—

1. The improvement in oil-cans herein described, consisting of a glass oil-holder, a metallic fixed cover, and a metallic fixed base.

2. A glass oil-can having a fixed metallic cover, provided with ears for the carrying-bail.

3. The improved manufacture herein described, consisting of a glass oil-holder, a metallic fixed cover, having a spout, a vent-tube, a filling-nozzle, and a bail, and a metal base or foot.

4. The combination, with a glass oil-holder, of a fixed metallic carrying-cover and an intermediate metallic securing-band for said cover.

5. The neck of an oil-can, having outside recesses crossed by vertical ridges, in combination with a metallic cover-securing band, f, having an annular bead, and united to said neck by cement or plaster-of-paris filling, as herein set forth.

6. The intermediate cover-securing metallic band f, having an outward flaring projecting base, f', in combination with the fixed cover of a glass oil-can, whereby said band forms an accessible soldering-base for the cover.

7. The glass oil-can, having the bottom annular recess k, the bottom bead m, and the groove n, crossed by vertical ridges, in combination with a base-band, s, having an interior annular groove.

8. The band s of the base C, in combination with a glass oil-can having a bottom annular recess, the top of which recess terminates in an upwardly-inclined bearing-shoulder, l, for said band.

9. The combination of the glass oil-holder, recessed at its bottom, as described, with a base-band having an outward-projecting bead, t, and an annular flaring base, C, the upper edge of which rests against said bead, for the purpose stated.

In testimony that we claim the foregoing we have affixed our signatures in the presence of two witnesses.

CHAS. S. S. BARON.
CHARLES H. TALLMAN.

Witnesses:
  JAMES C. TALLMAN,
  WM. H. TALLMAN.